ized pattern surface. The

(12) United States Patent
Nadershahi et al.

(10) Patent No.: US 9,671,609 B2
(45) Date of Patent: Jun. 6, 2017

(54) DISPLAY DEVICE AND METHOD FOR REDUCING MOIRÉ EFFECTS USING THE SAME

(71) Applicant: SCT TECHNOLOGY, LTD., Grand Cayman (KY)

(72) Inventors: Shahnad Nadershahi, Simi Valley, CA (US); Kjetil Osa Edvardsen, Skedsmokorset (NO)

(73) Assignees: SCT TECHNOLOGY, LTD., Grand Cayman (KY); DISPLAY SYSTEMS AS, Skedsmokorset (NO)

( * ) Notice: Subject to any disclaimer, the term of this patent is extended or adjusted under 35 U.S.C. 154(b) by 321 days.

(21) Appl. No.: 14/490,879

(22) Filed: Sep. 19, 2014

(65) Prior Publication Data
US 2016/0033113 A1    Feb. 4, 2016

Related U.S. Application Data

(60) Provisional application No. 62/031,951, filed on Aug. 1, 2014.

(51) Int. Cl.
| | |
|---|---|
| *G09F 13/08* | (2006.01) |
| *G02B 27/00* | (2006.01) |
| *G02F 1/1335* | (2006.01) |

(52) U.S. Cl.
CPC ........ *G02B 27/00* (2013.01); *G02F 1/133603* (2013.01); *G02F 1/133606* (2013.01); *G02F 1/133611* (2013.01)

(58) Field of Classification Search
CPC ......... G02B 27/00; F21V 21/30; F21V 14/02; F21V 21/14; F21V 14/06; F21V 17/02;
(Continued)

(56) References Cited

U.S. PATENT DOCUMENTS

| 5,071,206 A | * | 12/1991 | Hood | ..................... B32B 17/10 |
| | | | | 204/192.27 |
| 6,075,581 A | | 6/2000 | Shirochi | |
| | | (Continued) | | |

FOREIGN PATENT DOCUMENTS

| WO | 2004051354 A1 | 6/2004 |
| WO | 2013018464 A1 | 2/2013 |

OTHER PUBLICATIONS

European Extended Search Report for EP 15770781.1 issued on Feb. 3, 2017.

*Primary Examiner* — Laura Tso
*Assistant Examiner* — Naomi M Wolford
(74) *Attorney, Agent, or Firm* — Novick, Kim & Lee, PLLC; Allen Xue

(57) ABSTRACT

A display device includes a printed circuit board (PCB) having a plurality of light emitting members, an anti-moiré member spaced away from the plurality of light emitting members at about a first distance (d), and a frame member receiving the PCB such that the PCB is interposed between the anti-moiré and the frame member. The anti-moiré member includes a first layer disposed to face the PCB and having a first foil with a randomized pattern surface. The first distance (d) equals $L/(2*\tan(\alpha))$. The second distance (L) is a shortest distance between two adjacent light emitting members. Each of the array of light emitting members has a radiation angle $\alpha$.

20 Claims, 5 Drawing Sheets

(58) Field of Classification Search
CPC ......... G02F 1/133603; G02F 1/133606; G02F 1/133611
USPC .............................................. 362/97.1, 285
See application file for complete search history.

(56) References Cited

U.S. PATENT DOCUMENTS

| | | | |
|---|---|---|---|
| 7,652,736 B2* | 1/2010 | Padiyath | B32B 17/10018 349/115 |
| 8,177,408 B1 | 5/2012 | Coleman | |
| 8,517,573 B2* | 8/2013 | Wang | G02B 5/0221 359/831 |
| 8,647,727 B1 | 2/2014 | Barnidge et al. | |
| 2003/0132895 A1 | 7/2003 | Berstis | |
| 2003/0184665 A1 | 10/2003 | Berstis | |
| 2006/0238664 A1 | 10/2006 | Uehara et al. | |
| 2007/0121208 A1 | 5/2007 | Ogawa et al. | |
| 2008/0074870 A1 | 3/2008 | Kodama et al. | |
| 2010/0039590 A1* | 2/2010 | Miyatake | C09J 129/04 349/96 |
| 2010/0295762 A1* | 11/2010 | Yeom | G02B 5/0231 345/87 |
| 2012/0002278 A1 | 1/2012 | Zerega et al. | |
| 2012/0075887 A1* | 3/2012 | Parker | F21V 5/00 362/612 |
| 2014/0043773 A1* | 2/2014 | Lin | H05K 7/10 361/728 |
| 2014/0092629 A1 | 4/2014 | Lin et al. | |
| 2014/0173884 A1* | 6/2014 | Lai | H05K 1/0292 29/593 |
| 2015/0098231 A1* | 4/2015 | Chou | F21V 21/14 362/418 |

* cited by examiner

DISPLAY DEVICE AND METHOD FOR REDUCING MOIRÉ EFFECTS USING THE SAME

FIELD OF THE INVENTION

This invention relates generally to a display device, in particular to a display device with reduced moiré effects and a method for reducing moiré effects.

BACKGROUND OF THE INVENTION

Moiré effects are interference patterns of light or other radiation that occurs when sets or patterns of lines, dots, or other repeating features are superimposed on each other. Such interference patterns could be caused by having a multiplicity of the display elements in an array on a display screen. For example, the display may be formed by laminating a number of light emitting diodes (LEDs) to a printed circuit board (PCB), and typically has a regular array of square pixels. In this case, the interference patterns may be caused by the overlaid radiated lights from the sources of LEDs.

Several methods have been disclosed for reducing the moiré effects in displays. For instance, U.S. published applications No. US 2003/0132895 and No. US 2003/0184665 disclose using non-uniformly spaced pixels to avoid moiré effects between display elements such as LCDs, LEDs or TFTs and features of an image being displayed or being detected by a sensor array. U.S. Pat. No. 6,075,581 discloses an optical filter for reducing moiré effects in an LCD or other displays having a matrix-like pixel pattern. Published international application No. WO2004/051354 discloses an electrophoretic display with a two-layer structure in which laminating a top micro-cup layer to a bottom layer at an angle or a less symmetrical micro-cup array is used to avoid formation of undesirable moiré patterns.

Above mentioned methods or display devices employ asymmetrical arrangement of a plurality of pixels to avoid the moiré effects. However, asymmetrical arrangement of the pixels may not be feasible for high resolution displays that requires a large scale integration of pixels. A new display device and a method for reducing moiré effects without changing the arrangement of the pixels are needed.

SUMMARY OF THE INVENTION

In view of the aforementioned needs, the present disclosure provides a display device and a method for reducing moiré effects. According to an embodiment of the present disclosure, a display device is provided. The display device includes a printed circuit board (PCB) having a plurality of light emitting diodes (LEDs), a frame member supporting the PCB, an anti-moiré member spaced away from the LEDs at about a first distance (d). The anti-moiré member includes a first layer facing the PCB and having a first foil with a randomized pattern surface. A distance between the LEDs and the anti-moiré member equals about the first distance (d), and the anti-moiré member is transparent.

According to another embodiment of the present disclosure, a display device is provided. The display device includes a printed circuit board (PCB) having a plurality of light emitting diodes (LEDs), a frame member, and the anti-moiré member.

The frame member includes a first bracket and a second bracket, providing structural support for the PCB. In one embodiment, the anti-moiré member is spaced away from the LEDs on the frame member. The anti-moiré member includes a plurality of distinct layers. In one embodiment, the anti-moiré member has a first layer, a second layer, a third layer, and a fourth layer. The first layer is disposed to face the PCB and has a first foil with a randomized pattern surface. The second layer is disposed on the first layer and has a second foil with a colored transparent film. The third layer is disposed on the second layer. The third layer is made of an untreated glass. The fourth layer is disposed on the third layer having a third foil with a matte surface. The distance between the LEDs and the anti-moiré member is about the first distance (d).

In an array of LED such as in a display, the shortest distance between to adjacent LEDs is hereby defined as the second distance (L). Each of the plurality of LEDs has a radiation angle α, and the first distance (d) is calculated by a following equation:

$$d = L/(2 * \tan(\alpha))$$

Each of the first and the second bracket is configured to adjust a distance between the PCB and the anti-moiré member.

According to another embodiment of the present disclosure, a method for reducing moiré effects includes a step of providing a display having a printed circuit board (PCB), a step of calculating a first distance (d) between the PCB and the anti-moiré member, and a step of adjusting a distance between the PCB and the anti-moiré member to about the first distance (d).

The distance between the LEDs and the anti-moiré member is adjusted to about the first distance (d) so that the LEDs substantially maintain an equal distance from the anti-moiré member. The adjustment is accomplished by adjusting at least one of the first bracket and the second bracket.

DETAILED DESCRIPTION OF THE PREFERRED EMBODIMENT

Figure 1:
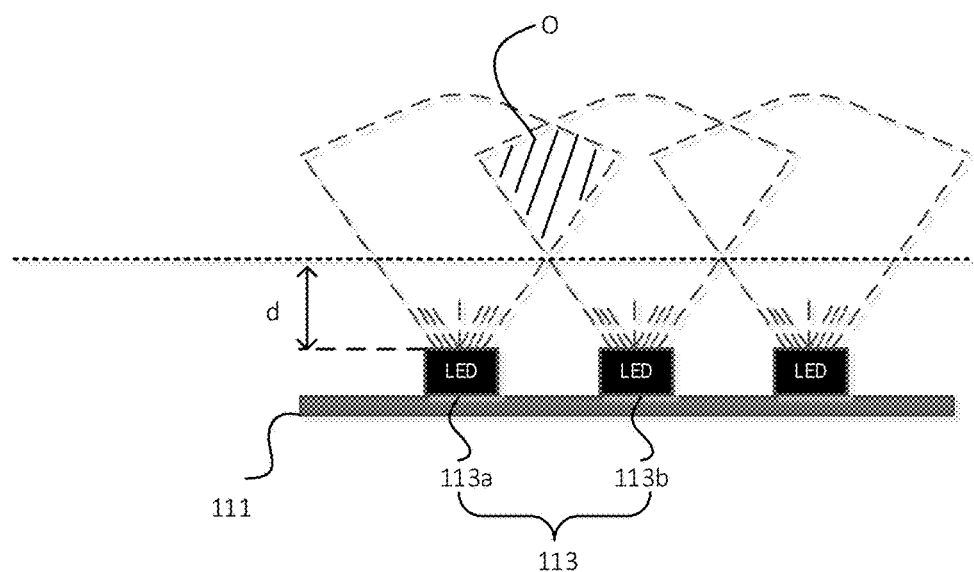
FIG. 1 is a schematic diagram illustrating moiré effects.

Reference will now be made in detail to embodiments, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the disclosure. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another.

In the following description, all numbers disclosed herein are approximate values, regardless whether the word "about" or "approximate" is used in connection therewith. The value of each number may differ by 1%, 2%, 5%, 7%, 8%, 10%, 15% or 20%. Therefore, whenever a number having a value N is disclosed, any number having the value N+/−1%, N+/−2%, N+/−3%, N+/−5%, N+/−7%, N+/−8%, N+/−10%, N+/−15% or N+/−20% is specifically disclosed, wherein "+/−" refers to plus or minus. Whenever a numerical range with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined above is also specifically disclosed.

In this disclosure, a light emitting member or an LED refers to a single light emitting diode or a cluster of LEDs packaged together, e.g., a RGB LED. Furthermore, the array of LED is mounted on a flat surface, such as a PCB board. Although LED is used as an example of light emitting members herewith, any other electronic component of light emitting members can be used in accordance with an embodiment of the present invention.

These and/or other aspects become apparent and are more readily appreciated by those of ordinary skill in the art from the following description of embodiments of the present disclosure, taken in conjunction with the accompanying drawings. The figures depict embodiments of the present disclosure for purposes of illustration only. One skilled in the art will readily recognize from the following description that alternative embodiments of the structures and methods illustrated herein may be employed without departing from the principles of the disclosure described herein.

FIG. 1 is a schematic diagram illustrating moiré effects. As shown in FIG. 1, each of the first LED 113a and the second LED 113b forms a radiation field respectively. An overlapped radiation field O exists between the first and second LEDs 113a and 113b. In FIG. 1, a dotted line is located at about the first distance (d) from the LEDs 113 and indicates a line where the overlapped radiation field O starts. In one embodiment, an anti-moiré member can be located at about the first distance (d) above the LEDs 113 to reduce the moiré effects.

Figure 2:
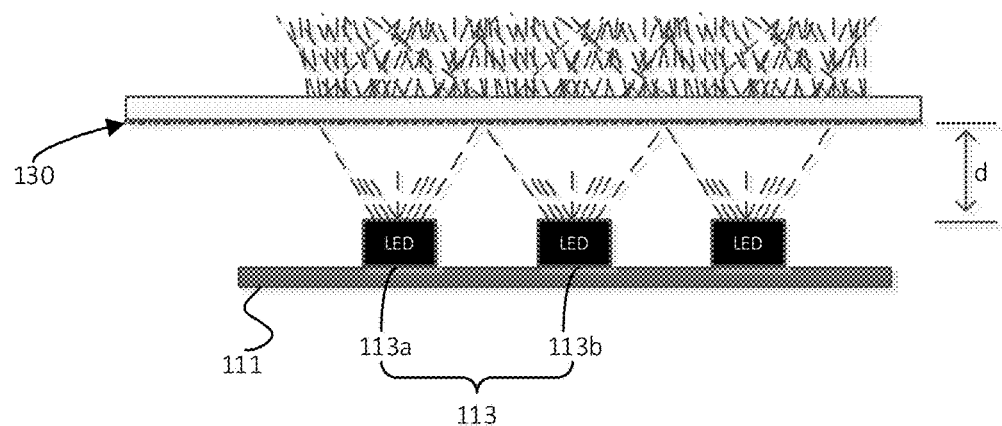
FIG. 2 is a schematic cross-sectional view of the display device according to the embodiment of the present disclosure illustrating the first distance (d) between an anti-moiré member and LEDs.

FIG. 2 is a schematic cross-sectional view of the display device according to the embodiment of the present disclosure illustrating the first distance (d) between anti-moiré member 130 and LEDs 113, and a function of anti-moiré member 130. As shown in FIG. 2, light emitted from LEDs 113 is randomly refracted after passing through anti-moiré member 130, reducing the number of repeating patterns superimposed on one another.

Figure 3A:
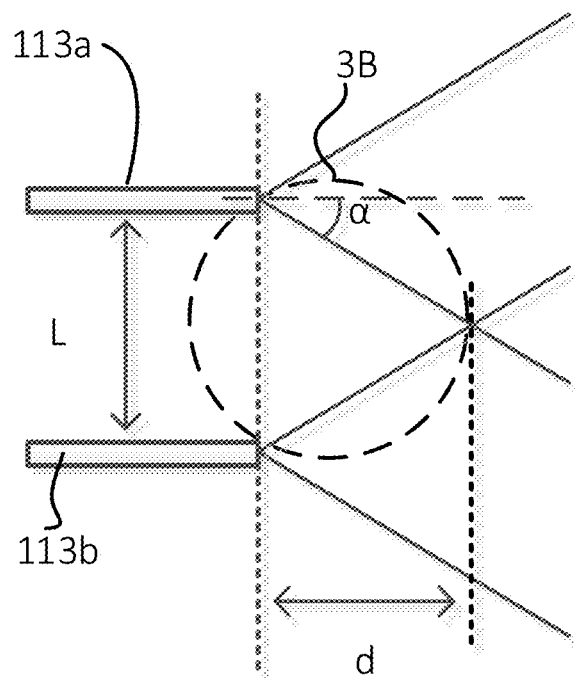
FIG. 3A is a schematic diagram illustrating a relationship among a radiation angle α, the first distance (d) between an anti-moiré member and LEDs, and the second distance (L) between two adjacent LEDs.
Figure 3B:
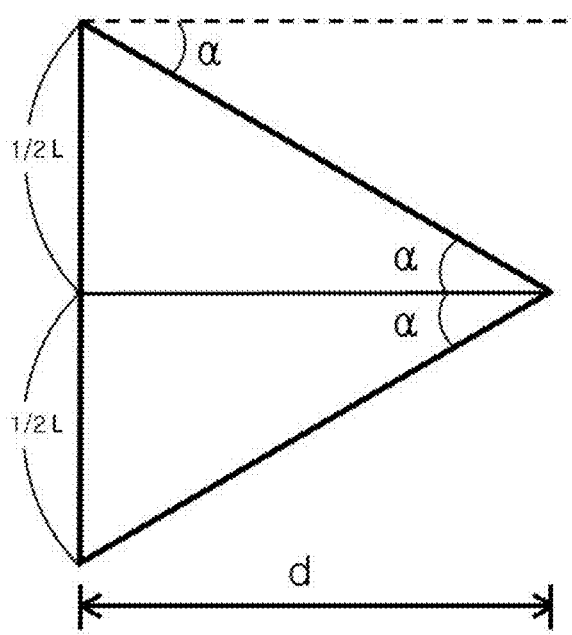
FIG. 3B is an enlarged view of the portion of FIG. 3A shown in the view circle 3B.

FIG. 3A is a schematic diagram illustrating a relationship among a radiation angle α, the first distance (d) between anti-moiré member 130 and LEDs 113, and second distance (L) being the shortest distance between two adjacent LEDs 113a and 113b. FIG. 3B is an enlarged view of the portion of FIG. 3A shown in the view circle 3B.

The plurality of LEDs can be arranged in different patterns, such as in rows and columns. The distance between two adjacent LEDs in a row or in a column can be different or the same. When such a distance is different, the second distance (L) can be equal to the value of the shortest distance between two adjacent LEDs. In a display with a uniform pixel pitch, such a distance is the same, which is second distance (L).

Each of the plurality of LEDs 113 has a radiation angle α. The radiation angle α is half the vertex angle of the cone of light emitted at the exit face of each of LEDs 113. According to a formula of tangent, tangent α can be obtained by the opposite side of the radiation angle α divided by the adjacent side of the radiation angle α. Thus, first distance (d) can be calculated according to equation 1

$$d=L/(2*\tan(\alpha))$$ [Equation 1]

For exemplary purpose, radiation angle α may be in a range of 45 to 50 degrees. Thus, according to the question 1, the first distance (d) may be in a range of 0.42 L to 0.5 L.

Figure 4:
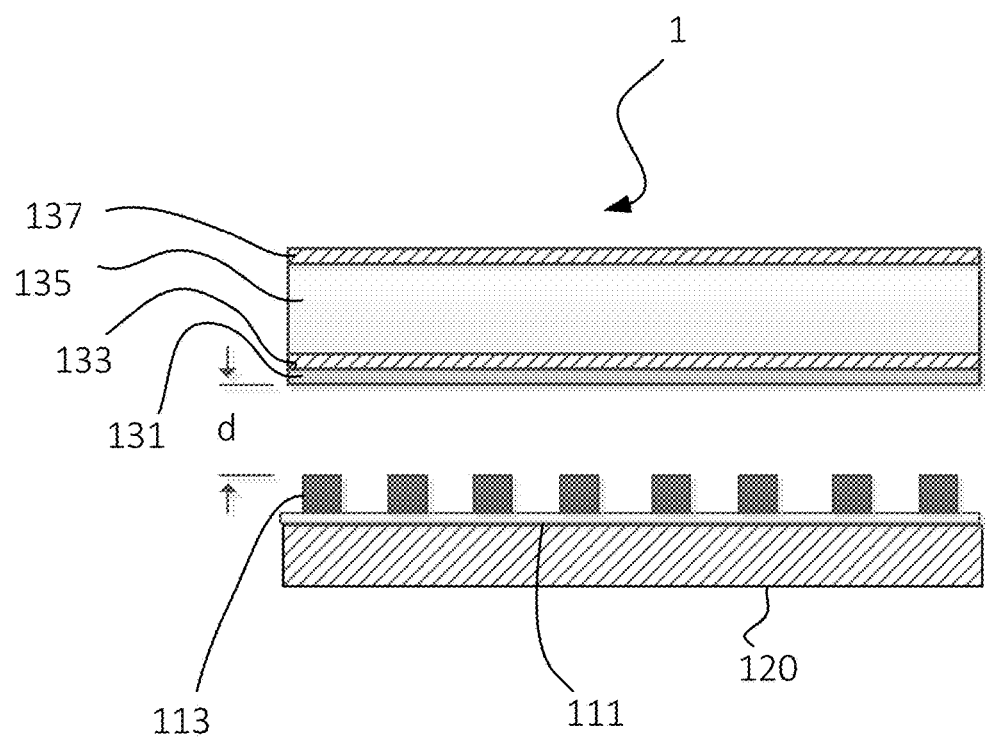
FIG. 4 is a schematic cross-sectional view of a display device according to an embodiment of the present disclosure.

FIG. 4 is a schematic cross-sectional view of a display device 1 according to an embodiment of the present disclosure. The display device 1 includes a printed circuit board (PCB) 111, a frame member 120, and an anti-moiré member 130.

PCB 111 includes a plurality of light emitting diodes (LEDs) 113. LED is a two-lead semiconductor light source. Recent developments in LEDs allow them to be used in environmental lighting. LEDs have many advantages including lower energy consumption, longer lifetime, improved physical robustness, smaller size, and faster switching. LEDs can be manufactured to be smaller size so that they can be placed with high density over flat or even shaped substrates including PCBs. A plurality of LEDs can be equidistantly mounted on PCB 111 in an array.

Frame member 120 physically supports PCB 111. The details of a structure of frame member 120 will be described later. Anti-moiré member 130 includes transparent randomized surface so that light from LEDs 113 is randomly refracted as it passes through anti-moiré member 130. The surface of anti-moiré member 130 has approximately equal luminance to all directions as light passes therethrough. The visibility of objects, except for a light-emitting objects, is primarily obtained by diffusion of a reflection of light. Diffusely-scattered light forms an image of the object in the observer's eye or the camera. Equally diffused light would not cause the moiré effects. The surface of the anti-moiré member can be fabricated with an irregular texture to equally diffuse light to all directions. The surface may be made of fibers or selected organic cells with their membranes and their complex internal structure.

Figure 5:
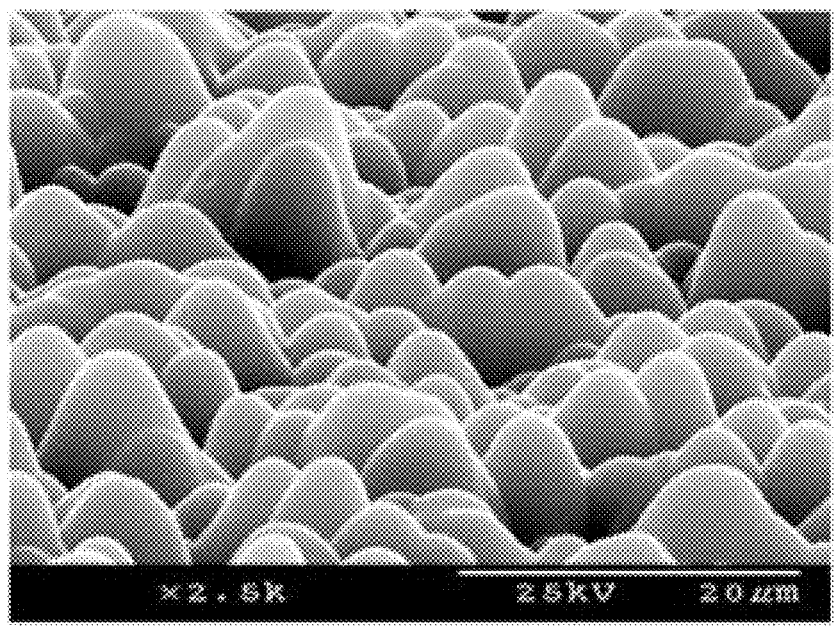
FIG. 5 is a micrograph of a first foil with a randomized pattern surface.

In one embodiment, anti-moiré member 130 includes a first layer 131, a second layer 133, a third layer 135, and a fourth layer 137. First layer 131 is disposed to face PCB 111. First layer 131 is a first foil with a randomized pattern surface. For exemplary purpose and not limiting thereto, Light Shaping Diffusers® or LSD® manufactured by Luminit® can be used for the first foil. FIG. 5 is a picture of a first foil with a randomized pattern surface taken by scanning electron microscope (SEM).

The randomized surface of the first foil has a peak-valley height in a range of about 0 to 2 μm. The first foil can have a transparent pressure sensitive adhesive (PSA). PSA is selected from the group consisting of an acrylic compound, a methacrylate compound, a rubber compound, a water based compound, a solvent based compound, a silicone compound, and a styrene compound.

Second layer 133 is disposed on first layer 131. In one embodiment, second layer 133 is a second foil with a colored transparent film. The colored transparent film can have a dark color and is used for enhancing contrast in color. For exemplary purpose only and not limited thereto, the colored transparent film can have a shading coefficient of about 0.65, a visible light reflected of about 5%, a visible light transmission of about 85%, an emissivity of about 0.87, and U value of about 1.09.

Third layer 135 is disposed on second layer 133. In one embodiment, third layer 135 is made of an untreated transparent glass. The untreated glass is not harden glasses and does not include iron therein. For exemplary purpose only and not limited thereto, the untreated glass can have a thickness of about 6 mm.

Fourth layer 137 is disposed on third layer 135. In one embodiment, the fourth layer has a third foil with a matte surface. For instance, PERMACOLOR® 7284 manufactured by MACTAC® can be used as the matte surface foil. The matte surface foil can be a 70μ semi-matt PVC film coated on one side with a clear solvent acrylic pressure sensitive adhesive. The matte surface foil has anti-reflective properties. The matte surface foil can reduce color fade caused by ultraviolet light exposure.

Anti-moiré member 130 is spaced away from PCB 111. PCB 111 is mounted on frame member 120. A flange (not shown) of frame member 120 holds anti-moiré member 130 away from the PCB 111 so that anti-moiré member 130 is located at about a predetermined distance at about the first distance (d) with the LEDs 113.

Figure 6:
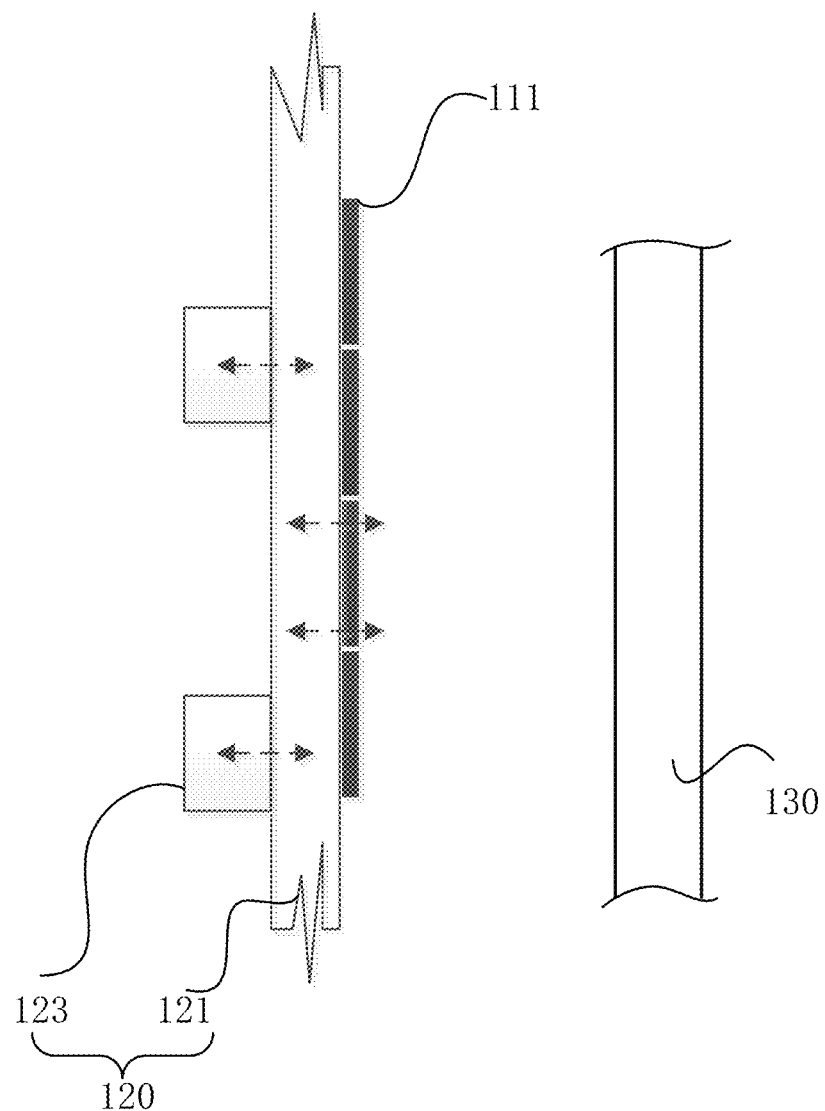
FIG. 6 is a schematic cross-sectional view of the display device according to the embodiment of the present disclosure including a first bracket and a second bracket.

FIG. 6 is a schematic cross-sectional view of the display device according to the embodiment of the present disclosure having an adjustment mechanism. In this embodiment, the adjustment mechanism includes a first bracket 121 and a second bracket 123. A large scale display device may have difficulties in controlling bows and twists of the large scale surface thereof. Other than correcting an unevenness of the surface, keeping about same distance at about the first distance (d) between the LEDs 113 and anti-moiré member 130 is also important to avoid the moiré effects as well. First bracket 121 and second bracket 123 can help reduce an unevenness of the surface and maintain a distance between the LEDs 113 and anti-moiré member 130.

First bracket 121 and second bracket 123 provide a structural support for PCB 111. First bracket 121 and second bracket 123 are configured to intersect each other at a predetermined angle. Each of first bracket 121 and second bracket 123 can have an elongated shape. A plurality of first brackets 121 and a plurality of second brackets 123 can be stacked to enhance the mechanical strength and stability of the structure. First bracket 121 can be disposed in a vertical direction with respect to the display device. Second bracket 123 can be disposed in a horizontal direction with respect to the display device.

Each of first bracket 121 and the second bracket 123 is configured to mechanically calibrate a distance between LEDs 113 and anti-moiré member 130. For exemplary purpose only, each of first bracket 121 and second bracket 123 can include one screw rig or two screw rigs to change a location of PCB 111 such that a distance between LEDs 113 mounted on PCB 111 and anti-moiré member 130 can be adjusted. PCB 111 is configured to be movable toward anti-moiré member 130 by each of first bracket 121 and second bracket 123. Each of first bracket 121 and second bracket 123 guides PCB 111, respectively, in a perpendicular direction to the plane formed by a surface of anti-moiré member 130. Each of first bracket 121 and the second bracket 123 is configured to adjust the distance in a range of 0 to 10 mm. First bracket can be configured to perform a coarse adjustment. Second bracket 123 can be configured to perform a fine adjustment.

In one embodiment, PCB 111 is configured to be detachably attached to frame member 120 via a magnetic connector (not shown) in four corners. The magnetic connector is configured to adjust a distance between LEDs 113 and anti-moiré member 130 in a range of 0 to 5 mm.

Figure 7:
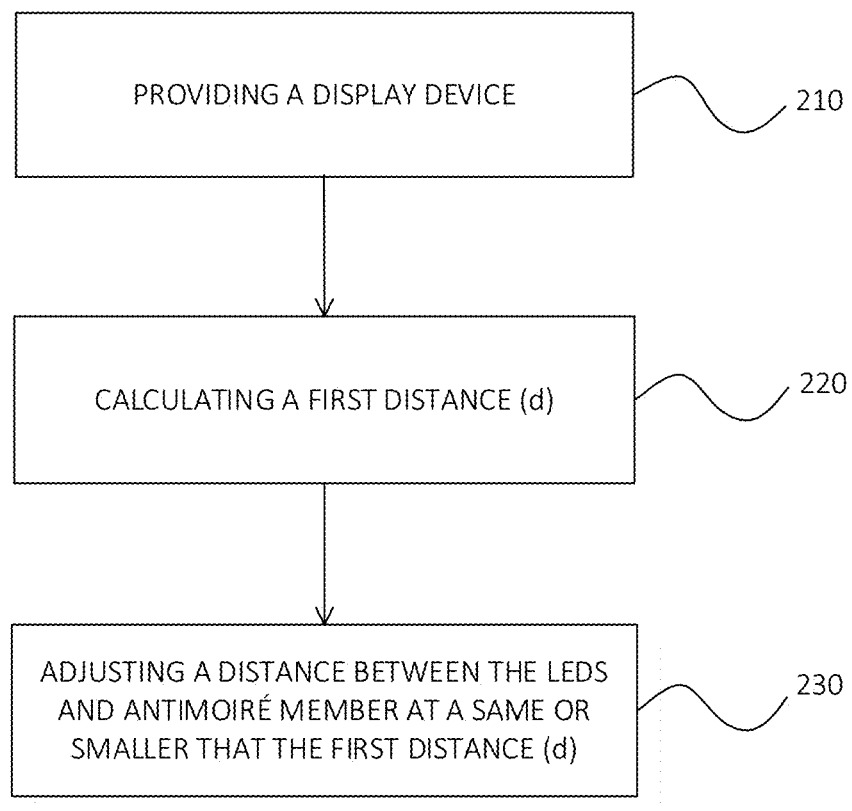
FIG. 7 is a flowchart illustrating the method for reducing moiré effects.

FIG. 7 is a schematic flowchart of the method for reducing moiré effects by calibrating a location of PCB 111. Step 210 refers to a step of providing a display having a printed circuit board (PCB). As explained above, PCB 111 includes LEDs 113, frame member 120, and anti-moiré member 130. Step 220 refers to a step of calculating a first distance (d) between LEDs 113 and anti-moiré member 130. Step 230 refers to a step of adjusting a distance between LEDs 113 and anti-moiré member 130 to about the first distance (d) so that LEDs 113 maintains an equal distance from anti-moiré member 130 across a surface of PCB 111. Step 230 may include to adjust the distance with a coarse adjustment and a fine adjustment.

It is to be understood that the exemplary embodiments described herein are that for presently preferred embodiments and thus should be considered in a descriptive sense only and not for purposes of limitation. Descriptions of features or aspects within each embodiment should typically be considered as available for other similar features or aspects in other embodiments.

What is claimed is:

1. A display device, comprising:
   a printed circuit board (PCB) having an array of light emitting members;
   an anti-moiré member spaced away from the array of light emitting members at about a first distance (d); and
   a frame member receiving the PCB so that the array of light emitting members are interposed between the anti-moiré member and the frame member,
   wherein the anti-moiré member comprises a first layer disposed to face the PCB,
   wherein the first layer comprises a first foil with a randomized pattern surface,
   wherein the frame member further comprises a first bracket and a second bracket, and each of the first bracket and the second bracket provides a structural support for the PCB, and
   wherein the first bracket is configured to perform a coarse adjustment of a distance between the light emitting members and the anti-moiré member, and the second bracket is configured to perform a fine adjustment of the distance between the light emitting members and the anti-moiré member.

2. The display device of claim 1, wherein the first distance (d) equals $L/(2*\tan(\alpha))$, wherein a second distance (L) is a shortest distance between two adjacent light emitting members, and wherein $\alpha$ is a radiation angle of the light emitting member.

3. The display device of claim 2, wherein the radiation angle $\alpha$ is in a range of 45 to 50 degrees.

4. The display device of claim 3, wherein the first bracket is a vertical bracket and the second bracket is a horizontal bracket.

5. The display device of claim 1, wherein the first bracket is configured to adjust a distance between the light emitting members and the anti-moiré member in a range of 0 to 10 mm.

6. The display device of claim 1, wherein second bracket is configured to adjust a distance between the light emitting members and the anti-moiré member in a range of 0 to 10 mm.

7. The display device of claim 1, wherein the PCB is configured to be movable toward an anti-moiré member by each of the first bracket and the second bracket, each of the first bracket and the second bracket respectively guides the PCB in a direction perpendicular to a plane formed by a surface of the anti-moiré member.

8. The display device of claim 1, wherein the PCB is detachably attached to the frame member using a magnetic connector.

9. The display device of claim 8, wherein the magnetic connector is configured to adjust a distance between the PCB and the anti-moiré member in a range of 0 to 5 mm.

10. The display device of claim 1, wherein the first foil has the randomized pattern surface having a peak-valley height in a range of 0 to 2 μm.

11. The display device of claim 1, wherein the first foil comprises a transparent pressure sensitive adhesive (PSA), and wherein the PSA is selected from the group consisting of an acrylic compound, a methacrylate compound, a rubber compound, a water based compound, a solvent based compound, a silicone compound, and a styrene compound.

12. The display device of claim 1, wherein the anti-moiré member further comprises a second layer disposed on the first layer and having a second foil with a colored transparent film.

13. The display device of claim 12, wherein the colored transparent film has a shading coefficient of about 0.65, a visible light reflected of about 5%, a visible light transmission of about 85%, an emissivity of about 0.87, and U value of about 1.09.

14. The display device of claim 13, wherein the anti-moiré member further comprises a third layer disposed on the second layer and the third layer is made of an untreated transparent glass, and wherein the third layer has a thickness of about 6 mm.

15. The display device of claim 14, wherein the anti-moiré member further comprises a fourth layer disposed on the third layer and the fourth layer has a third foil with a matte surface.

16. A method for reducing moiré effects in a light emitting diode (LED) in a display device of claim 1, the method comprising:

placing a display device of claim 1 on a surface;
calculating the first distance (d) that equals $L/(2*\tan(\alpha))$, wherein L is a shortest distance between two adjacent light emitting members, and $\alpha$ is the radiation angle for each of the light emitting member in the array of light emitting members in the display device; and
adjusting a distance between the light emitting members and the anti-moiré member to about the first distance (d).

17. The method of claim 16, wherein the adjustment step is carried out using at least one of the first bracket and the second bracket.

18. The method of claim 16, wherein the anti-moiré member further comprises a second layer disposed on the first layer and having a second foil with a colored transparent film, a third layer disposed on the second layer and being made of an untreated glass, and a fourth layer disposed on the third layer having a third foil with a matte surface.

19. The method of claim 16, wherein the radiation angle $\alpha$ is in a range of 45 to 50 degrees.

20. A display device comprising:
a printed circuit board (PCB) having a plurality of light emitting members;
a frame member comprising:
a first bracket, and
a second bracket, wherein each of the first bracket and the second bracket provides a structural support for the PCB; and
an anti-moiré member spaced away from the light emitting members at about a first distance (d), and the anti-moiré member comprising:
a first layer disposed to face the PCB and having a first foil with a randomized pattern surface,
a second layer disposed on the first layer and having a second foil with a colored transparent film,
a third layer disposed on the second layer and being made of an untreated glass, and
a fourth layer disposed on the third layer having a third foil with a matte surface,
wherein the first distance (d) is equals $L/(2*\tan(\alpha))$,
wherein a second distance (L) is a shortest distance between two adjacent light emitting members,
wherein each of the array of light emitting members has a radiation angle $\alpha$,
wherein the first bracket is configured to perform a coarse adjustment of a distance between the light emitting members and the anti-moiré member, and the second bracket is configured to perform a fine adjustment of the distance between the light emitting members and the anti-moiré member, and
wherein the PCB is interposed between the anti-moiré member and the frame member.

* * * * *